United States Patent
Message et al.

(10) Patent No.: US 6,821,021 B2
(45) Date of Patent: Nov. 23, 2004

(54) INSTRUMENTED ANTIFRICTION BEARING DEVICE WITH TEMPORARY ANGULAR PRE-INDEXING OF THE ENCODER RELATIVE TO THE SENSOR

(75) Inventors: Olivier Message, Tours (FR); Franck Landrieve, Fondettes (FR); Samuel Gallion, Tours (FR); Jean-François Maestrati, Joue-les-Tours (FR)

(73) Assignee: SKF France, Clamart (FR)

( * ) Notice: Subject to any disclaimer, the term of this patent is extended or adjusted under 35 U.S.C. 154(b) by 79 days.

(21) Appl. No.: 10/182,118

(22) PCT Filed: Jan. 11, 2001

(86) PCT No.: PCT/FR01/00089
§ 371 (c)(1),
(2), (4) Date: Oct. 28, 2002

(87) PCT Pub. No.: WO01/55730
PCT Pub. Date: Aug. 2, 2001

(65) Prior Publication Data
US 2003/0147572 A1 Aug. 7, 2003

(30) Foreign Application Priority Data
Jan. 27, 2000 (FR) .......................................... 00 01053

(51) Int. Cl.$^7$ .............................. F16C 32/00; G01P 3/44
(52) U.S. Cl. ....................................... 384/448; 324/173
(58) Field of Search .......................... 384/448; 324/173, 324/174, 207.25

(56) References Cited

U.S. PATENT DOCUMENTS

| | | | |
|---|---|---|---|
| 5,015,001 A | 5/1991 | Jay | .............. 277/37 |
| 5,668,426 A | 9/1997 | Lamert et al. | .............. 310/168 |
| 6,043,643 A | * 3/2000 | Message et al. | .............. 324/174 |
| 6,094,046 A | * 7/2000 | Message et al. | .............. 324/173 |
| 6,595,693 B1 | * 7/2003 | Message et al. | .............. 384/448 |
| 6,655,844 B1 | * 12/2003 | Message et al. | .............. 384/448 |
| 2002/0181815 A1 | * 12/2002 | Beauprez | .............. 384/448 |

FOREIGN PATENT DOCUMENTS

| | | |
|---|---|---|
| DE | 198 06 206 | 8/1999 |
| EP | 0 665 436 | 8/1995 |
| EP | 0 949 510 | 10/1999 |
| FR | 2 754 903 | 4/1998 |

* cited by examiner

Primary Examiner—Thomas R. Hannon
(74) Attorney, Agent, or Firm—Smith, Gambrell & Russell

(57) ABSTRACT

The invention concerns an instrumented antifriction bearing device, provided with a non-rotating part including a non-rotating ring and sensor element, a rotating part including a rotating ring and encoder, and at least a row of rolling bodies arranged between two raceways of the non-rotating and the rotating rings. The non-rotating sensing element and the rotating encoder form an assembly detecting rotation parameters. The device includes a maintenance device for temporarily maintaining the angular indexing of the encoder relative to the sensing element in an angular position, wherein the encoder generates in the sensing element a reference signal. The maintenance device temporarily maintains the angular indexing device in position until released, as for example, by the axial displacement of at least part of an element of the device towards the row of rolling bodies.

21 Claims, 16 Drawing Sheets

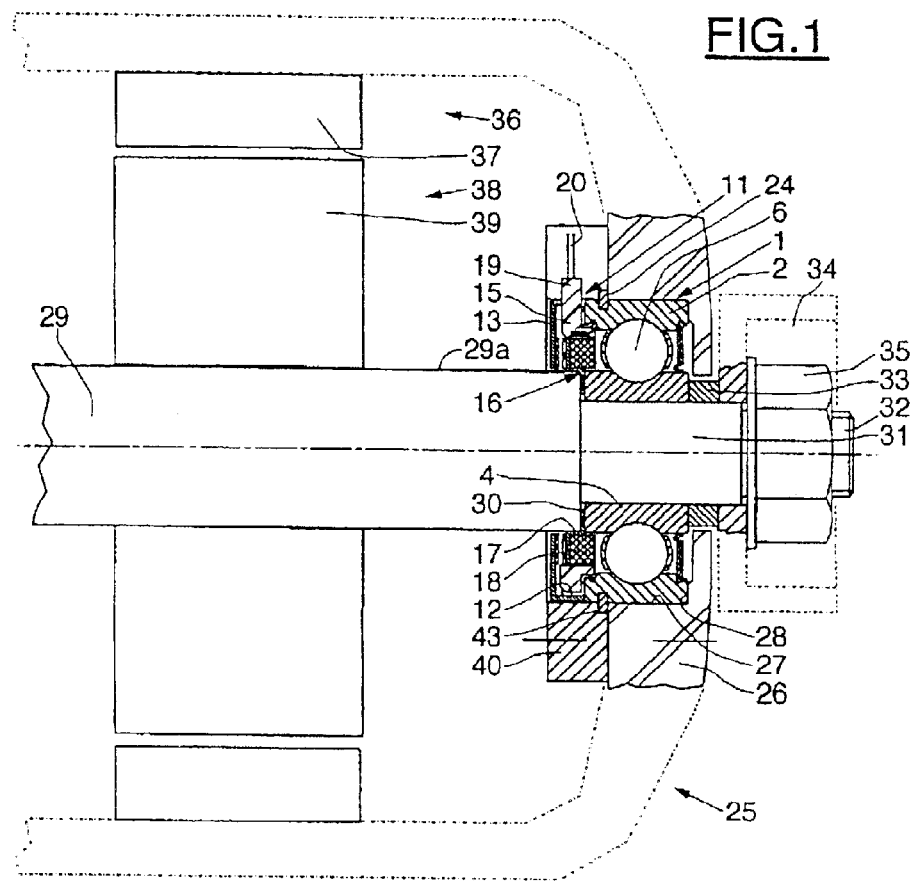
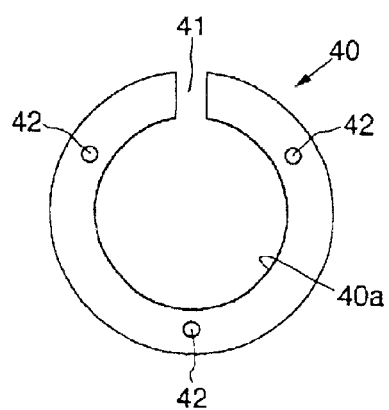

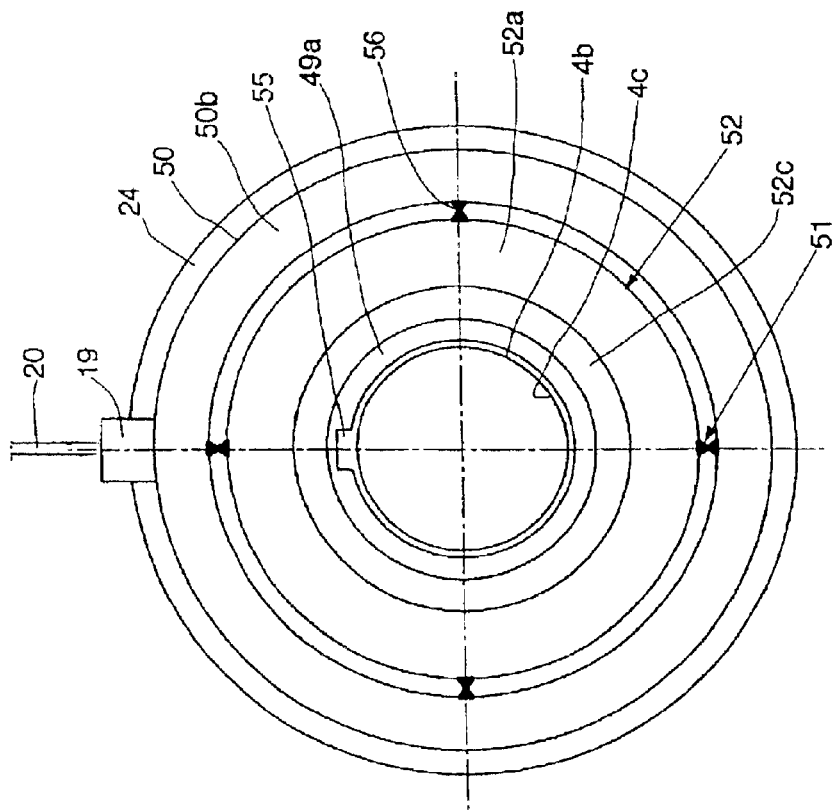
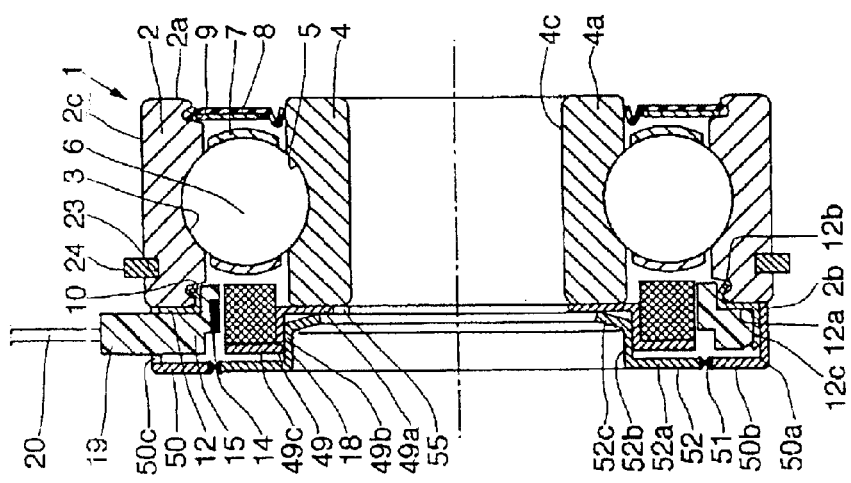
FIG. 12
FIG. 13

INSTRUMENTED ANTIFRICTION BEARING DEVICE WITH TEMPORARY ANGULAR PRE-INDEXING OF THE ENCODER RELATIVE TO THE SENSOR

The present invention relates to instrumented rolling bearings provided with a system for detecting rotation parameters such as angular position, rotation direction, speed and acceleration.

Instrumented rolling bearings and systems of the above kind are well known to the person skilled in the art, for example from the document FR-A-2 754 903. Instrumented rolling bearings can be used in the control of synchronous electric motors, for example, where it is desirable to know the relative angular position of the rotor poles and the stator poles, especially to determine when the rotor poles are aligned with the stator poles, as in this position the output torque is at a maximum.

The detector system comprising a sensor unit and an encoder supplies the motor control system with all the necessary information, in particular the rotation speed and the position of the rotor poles relative to the stator poles.

A rotatable part can be fitted with an encoder delivering pulses and a non-rotatable part can be fitted with a fixed sensor adapted to detect the pulses and to deduce therefrom information relating to movement of the rotatable part and its angular position relative to the non-rotatable part. In the conventional arrangement, the sensor-encoder system is independent of the rolling bearings enabling one part to rotate inside another part concentric with it.

The encoder can be a magnetic encoder in the form of a multipole ring in which the number of poles depends on the number of poles of the motor to be controlled. This is known in the art. The encoder can cooperate with a magnetosensitive sensor, for example a Hall effect sensor, delivering an output voltage varying on each change of polarity of the ring of the encoder and thus delivering a characteristic square-wave signal.

Using an instrumented rolling bearing provided with an encoder fastened to the rotatable race of the rolling bearing and a sensor fastened to the non-rotatable race of the same rolling bearing is also known in the art. A connector and a cable connect the sensor to an electronic unit which continuously analyzes and processes the signal coming from the sensor.

Compared to a conventional arrangement using a sensor/encoder detector system independent of the rolling bearing, using an instrumented rolling bearing offers substantial advantages for the end user, in particular with regard to compactness and the small number of parts, which facilitates installation.

In order to be able to determine the position of the rotor poles relative to those of the stator by means of the instrumented rolling bearing, it is clear that, when installing the rotor in the stator:

the sensor must be oriented angularly relative to the poles of the stator, the encoder must be oriented angularly relative to the sensor, and the encoder must be oriented angularly relative to the poles of the rotor.

These operations are relatively difficult because they must be carried out simultaneously during installation of the rotor in the stator. Mechanical or optical indexing means must be used when installing the rolling bearing in the electric motor to ensure simultaneous adequate relative angular orientation of the aforementioned components so that the signal from the instrumented rolling bearing can be used subsequently to identify the angular position of the rotor poles relative to the stator poles.

The present invention proposes an instrumented rolling bearing which is substituted for one of the two rolling bearings, thereby avoiding the need to install a separate sensor-encoder system in the motor, said instrumented rolling bearing further relieving the user of any need to index the encoder relative to the sensor and relative to the rotor poles during final installation in the motor.

An instrumented antifriction rolling bearing in accordance with one aspect of the invention includes a non-rotatable part comprising a non-rotatable race and sensor means, a rotatable part comprising a rotatable race and encoding means, and a row of rolling bodies arranged between two raceways of the non-rotatable ring and the rotatable ring. The non-rotatable sensing means and the rotatable encoding means form a system for detecting rotation parameters. The rolling bearing comprises temporary retaining beans for temporarily maintaining the angular indexing of the encoding means relative to the sensing means, in an angular position wherein said encoding means generate a reference signal in the sensing means.

The part that moves axially is advantageously adapted to be fastened to the rotatable part of the bearing.

In one embodiment of the invention the part that moves axially toward the row of rolling bodies is a support of the encoder means.

In another embodiment of the invention the part that moves axially toward the row of rolling bodies is mounted on a support of the encoder means.

In another embodiment of the invention the part that moves axially toward the row of rolling bodies is a member mounted on the rotatable race of the rolling bearing on the side opposite the encoder means.

The temporary retaining means are preferably active during transportation, manipulation and installation of the rolling bearing until it is permanently fixed into its housing and to the shaft.

Said temporary retaining means are advantageously part of said detector system. Said temporary retaining means can be fastened to a cap for protecting the sensor means.

In one embodiment of the invention said temporary retaining means comprise a friction member, for example in the form of elastomer pads, for example rubber pads.

In one embodiment of the invention the encoder means comprise a support. Said support has a first surface in axial contact with the rotatable race and a second surface axially opposite the first surface and in axial contact with the non-rotatable part.

Said support can be annular and made of sheet metal and have a radial or frustoconical portion including said first surface, a cylindrical portion and a radial portion including said second surface and extending toward said sensor means.

In one embodiment of the invention the coefficient of friction between the first surface of said support and the rotatable race is lower than that between the second surface and the non-rotatable part, so that said support is constrained to rotate with the non-rotatable part when the temporary retaining means are active. The contact between the second surface and the non-rotatable part can be a metal-to-metal contact and the contact between the first surface and the rotatable race can be a rubber-to-metal or rubber-to-rubber contact.

Said temporary retaining means advantageously comprise a weak member. It can be broken by applying a particular axial force to the encoder means or its support, for example when clamping the rolling bearing onto a shaft for supporting it.

In one embodiment of the invention the encoder means include a support having a connecting portion connecting it to the non-rotatable part. The connecting portion is fastened to the support of the encoder means and of the non-rotatable part before the weak member is broken, and has a mechanically weak area adapted to break to separate the encoder means from the non-rotatable part.

The connecting portion can be between a radial portion of a protective cap for the sensor means and a radial portion of the support for the encoder means, the connecting portion being formed in an annular space between them. Said radial portions can be coplanar before the weak member is broken. The connecting portion can be molded over both of said radial portions.

In one embodiment of the invention the mechanically weak area comprises a plurality of synthetic material studs.

In one embodiment of the invention the support of the encoder means is in one piece.

In another embodiment of the invention the support of the encoder means is in two parts at least one of which is in direct contact with the encoder means and at least one of which is in direct contact with the temporary retaining means. The two parts can be concentric and fit together with friction contact. The two parts can be connected temporarily by weak studs.

In one embodiment of the invention the support of the encoder means has at least one axially deformable portion.

In one embodiment of the invention, the retaining means are in one piece.

In another embodiment of the invention, the retaining means are in two parts which are advantageously concentric and joined temporarily by weak studs.

In one embodiment of the invention, the retaining means are generally annular.

More generally, means are provided for releasing the temporarily fixed angular indexing by axial displacement of at least one portion of one component of the system in the direction of the row of rolling bodies. The releasing means are associated with the retaining means and break the coupling by moving the two coupled components axially. Radial friction surfaces are moved apart, weak portions are broken, etc. Said releasing means include an axial space to allow said axial displacement.

The present invention also proposes a method of installing an instrumented rolling bearing on a shaft. The rolling bearing is of the type having a non-rotatable part comprising a non-rotatable race and sensor means, a rotatable part comprising a rotatable race and encoder means, and a row of rolling bodies disposed between two rolling paths of the non-rotatable and rotatable races, the non-rotatable sensor means and the rotatable encoder means forming a rotation parameter detector system. Prior to installation, the encoder means are retained relative to the sensor means in an angular position in which said encoder means generate a reference signal in the sensor means. During clamping of the rolling bearing on the shaft, the encoder meals and the rotatable race of the rolling bearing are fastened together circumferentially, and the retention of the angular position of the encoder means relative to the sensor mean, is eliminated.

The temporarily fixed angular indexing is released by axial displacement of at least one portion of a component of the system toward the row of rolling bodies.

The encoder support is advantageously detached from the retaining means by axial displacement when attaching the encoder means to the rotatable race of the rolling bearing. Alternatively, the encoder support is detached from the retaining means by rotating the rotatable race.

The sensor means can of course comprise one or more sensors, in particular to increase the resolution and to determine a rotation direction. The sensor means can be magnetic or optical.

The present invention will be better understood after studying a detailed description of a few embodiments of the invention, provided by way of non-limiting example and shown in the accompanying drawings, in which:

FIG. 1 is a view in axial section of one end of an electric motor equipped with a first embodiment of a rolling bearing according to the invention;

FIG. 2 is a side elevation view of a fixing part used in the first embodiment of a rolling bearing according to the invention;

FIG. 12 is a view identical to FIG. 11, after orientation;

FIG. 13 is a side elevation view of the rolling bearing from FIG. 12;

Figure 3:
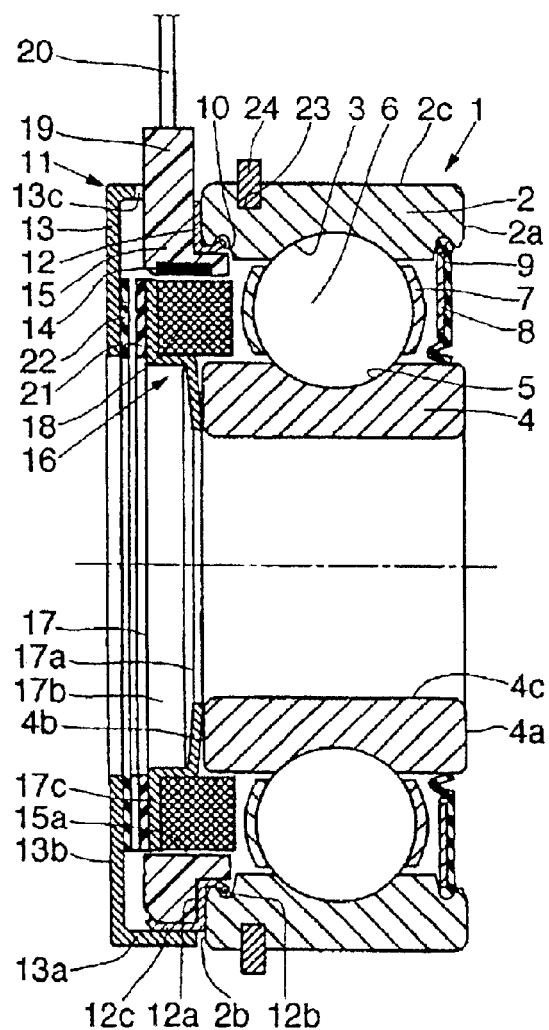
FIG. 3 is a view in axial section of the rolling bearing from FIG. 1 before pre-indexing.

As can be seen in FIGS. 1, 3, 5 and 6, a rolling bearing 1 comprises an outer race 2 provided with a raceway 3, an inner race 4 provided with a raceway 5, a row of rolling bodies 6, which are balls in this example, disposed between the raceways 3 and 5, a cage 7 for maintaining the circumferential spacing of the rolling bodies 6, and a seal 8 mounted on the outer race 2 and rubbing on a rolling bearing surface on the inner race 4, disposed radially between said two races 2 and 4 and axially between the row of rolling bodies 6 and one of the lateral surfaces of said races 2, 4. The seal 8 is mounted in a groove 9 formed in the outer race 2 in the vicinity of its radial lateral surface 2a. On the opposite side, the outer race 2 is provided with a groove 10 symmetrical to the groove 9 with respect to a plane passing through the center of the rolling bodies 6. A sensor unit 11 is mounted on the outer race 2 on the same side as the groove 10. The sensor unit 11 comprises a metal support 12, a metal cap 13, and a sensor element 14 buried in a synthetic material central part 15.

The generally annular metal support 12 has a radial wall 12a in contact with a radial front surface 2b of the outer race 2 on the same side as the groove 10 and extended at its inside edge by a rim 12b that is bent into the groove 10 and attaches the support 12 to the outer race 2. The metal support 12 also has a cylindrical part 12c extending from the outside edge of the radial part 12a axially opposite the rolling bearing 1 and terminating in a rim that is bent slightly and obliquely inward. The cylindrical portion 12c incorporates a notch.

The generally annular metal cap 13 has an L-shaped section comprising a cylindrical part 13a surrounding the cylindrical part 12c of the support 12 and adapted to be fitted thereto. The cylindrical portion 13a has an outside diameter that is substantially equal to, or even slightly less than, that of the outer race 2. The metal cap 13 also has a radial portion 13b extending from the end of the cylindrical portion 13a opposite the outer race 2 and oriented inward, its inside diameter being similar to the diameter of the outside cylindrical surface of the inner race 4. The cylindrical portion 13a of the cap 13 incorporate, a notch 13c open on the same side as the outer race 2 and aligned with the notch in the cylindrical portion 12c.

The central portion 15 is delimited radially and outwardly, outside the area of the notch 13c, by the cylindrical portion 12c of the support 12 and includes a bore 15a whose diameter is such that there is sufficient radial space for the encoder to be described later. The sensor element 14 fastened to the central portion 15 is flush with the bore 15a. A radially outwardly projecting end of the central portion 15 forms an outlet terminal 19 for a wire 20. Said terminal 19 passes through the notch 13c and through the notch in the cylindrical portion 12c.

An encoder 16 comprises an annular support 17 and an active portion 18. The support 17 has a frustoconical portion 17a substantially radially aligned with the inner race 4 and axially in contact with a lateral face 4b of said inner race 4 on the same side as the sensor unit 11, a cylindrical portion 17b extending from the outside edge of the frustoconical portion 17a and axially away from the inner race 4, and a radial portion 17c extending radially outward, toward the central portion 15, from the end of the cylindrical portion 17b opposite the inner race 4.

The annular active portion 18 of the encoder 16 has a generally rectangular section and is disposed on the outside perimeter of the cylindrical portion 17b and on the face of the axial portion 17c oriented toward the rolling bodies 6. The active portion 18 has substantially the same outside diameter as the free end of the radial portion 17c and extends axially toward the rolling bodies 6 beyond the frustoconical portion 17a between the outer race 2 and the inner race 4, substantially as far as the groove 10 in the outer race 2.

Figure 4:
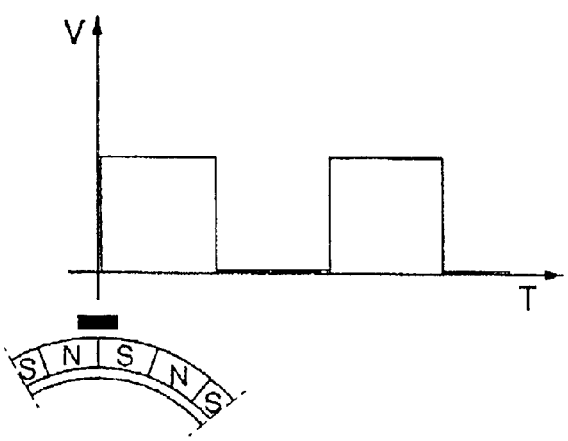
FIG. 4 is a diagram of the signal delivered by the sensor as a function of the position of the encoder.

The active portion 18 extends as far as the vicinity of the bore 15a in the central portion 15, with which it forms a radial airgap. When the inner race 4 rotates relative to the outer race 2, the active portion 18 of the encoder 16 rotates in front of the sensor element 14 which is adapted to supply at its output an electrical signal which can take the form shown in FIG. 4. The active portion 18 of the encoder 16 is a multipolar magnetized ring, made of plastoferrite, for example. The number of magnetic poles of the active portion 18 can be chosen to be a multiple of the number of poles of the motor in which the rolling bearing 1 is to be installed.

The encoder 16 and the sensor unit 11 form a rotation parameter detection system.

The outside face of the cylindrical portion 17c of the support 17 of the encoder 16, on the side opposite the active portion 18, is covered by a facing 21, for example an elastomer facing, forming a pad. The corresponding face of the axial portion 13b of the cap 13 is also partly covered by a facing 22, for example an elastomer facing, radially aligned with the facing 21 and also forming a pad.

The cylindrical outside surface 2c of the outer race 2 is provided with an annular groove 23 in which is disposed a circlip 24 projecting radially beyond said outer surface 2c.

FIG. 1 in particular shows the rolling bearing 1 installed in an electric motor, for example a synchronous electric motor. The electric motor 25 comprises a casing 26 provided at one end with a bore 27 delimited at one end by a shoulder 28 adapted to receive the outer race 2 of the rolling bearing 1 with the outside surface 2c coming into contact with the bore 27 and the front radial surface 2a coming into contact with the shoulder 28.

The motor 25 also includes a rotatable shaft 29 which terminates at the end of the motor 25 shown in FIG. 1 at a shoulder 30 followed by a cylindrical portion 31 of smaller diameter than the main portion of the shaft 29, followed by a screwthreaded free end 32. The bore 4c of the inner race 4 is received on the cylindrical portion 31 and the frustoconical portion 17a of the support 17 of the encoder 16 is gripped axially between the inner race 4 and the shoulder 30. The radial front surface 4a of the inner race 4 is in contact with a spacer 33 which in conjunction with the casing 26 defines a narrow passage. The annular spacer 33 has a rectangular section. A pulley, gear or other type of power transmission member 34 is mounted on the cylindrical portion 31 of the shaft 29, outside the casing 26 and in contact with the spacer 33, and is retained by a nut 35. The nut 35 thus clamps axially the frustoconical portion 17a of the support 17, the inner race 4, the spacer 33 and the member 34.

The motor 25 includes a stator 36 provided with a plurality of poles 37 and fastened to the casing 26 and a rotor 38 provided with a plurality of poles 39 and fastened to the shaft 29. The stator 36 and the rotor 38 are disposed so that the poles 39 of the rotor 38 rotate in front of the poles 37 of the stator 36 with a small airgap between them.

The motor 25 further includes a fixing part 40 which is also shown in FIG. 2. The generally annular fixing part 40 has a rectangular section with a slot 41 and three radial holes 42 adapted to receive screws for fixing it to the casing 26. The diameter of the bore 40a in the fixing part 40 is substantially equal to that of the outside surface 2c of the outer race 2 and the outside surface of the cylindrical portion 13a of the cap 13. An annular recess 43 is formed on the fixing part 40 at one end of its bore 40a. The fixing part 40 immobilizes the rolling bearing 1 axially. It also immobilizes the sensor unit 11 circumferentially and indexes it. The axial immobilization of the rolling bearing 1 is obtained by axial contact between the fixing part 40 and the circlip 24 fastened to the outer race 2, the circlip 24 projecting radially into the recess 43.

The fixing part 40 is screwed to the inside of the casing 26 adjacent the bore 27 of said casing 26 and around the sensor unit 11 and a portion of the outer race 2. Thus the rolling bearing 1 is immobilized on one side by the contact between the outer race 2 and the shoulder 28 on the casing 26 and on the other side by the circlip 24 cooperating with the recess 43 of the fixing part 40. Angular indexing is achieved because the terminal 19 of the sensor unit 11 locates in the slot 41 of the fixing part 40 which is itself screwed into the casing 26. Thus the angular position of the sensor 14 relative to the casing 26, and therefore relative to the poles 37 of the stator 36, is known. The angular position of the sensor 14 relative to the terminal 19 is known because it is a feature of the design. Thus the sensor 14 is angularly indexed relative to the poles 37 of the stator 36.

As shown in FIG. 3, the cap 13 is not fitted all the way onto the support 12. In other words, there remains a small axial space between the free end of the cylindrical portion 13a of the cap 13 and the radial surface 2b of the outer race 2. The encoder 16 is retained axially between the radial portion 13b of the cap 13 and the radial surface 4b of the inner race 4. The frustoconical portion 17a of the support 17 is free and in contact with said radial surface 4b. The facings 21 of the encoder 16 and 22 of the cap 13 are not in contact and are separated by a small axial space. Thus the encoder 16 can rotate relative to the inner race 4 and relative to the sensor unit 11. This is exploited to index the encoder 16 relative to the sensor 14 in an angular position such that a characteristic signal is generated in the encoder 14, for example a rising edge like that shown in FIG. 4, of the type that is obtained at the boundary between two poles of opposite polarity of the active portion 18 of the encoder 16. The encoder could, of course, have a portion, not shown, provided with a separate magnetic index to generate a characteristic signal for indexing the encoder 16 relative to the sensor unit 11 on passing the sensor 14 or an additional sensor, not shown.

Figure 5:
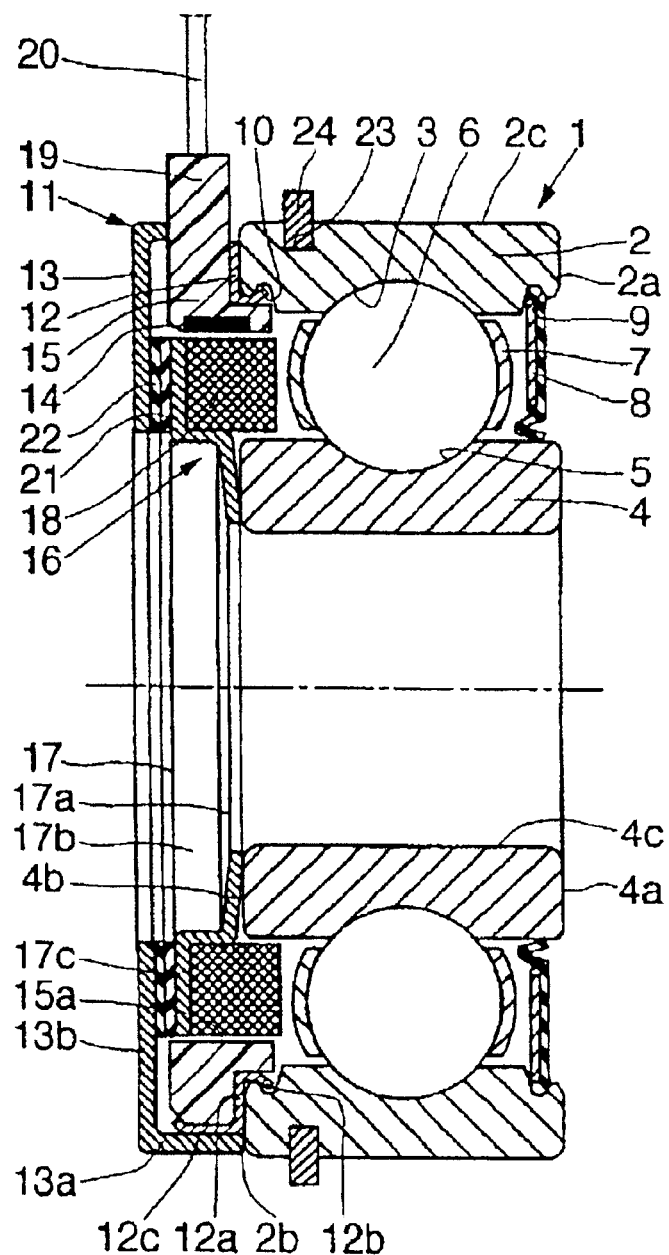
FIG. 5 is a view in axial section of the rolling bearing from FIG. 1 before installation.
Figure 6:
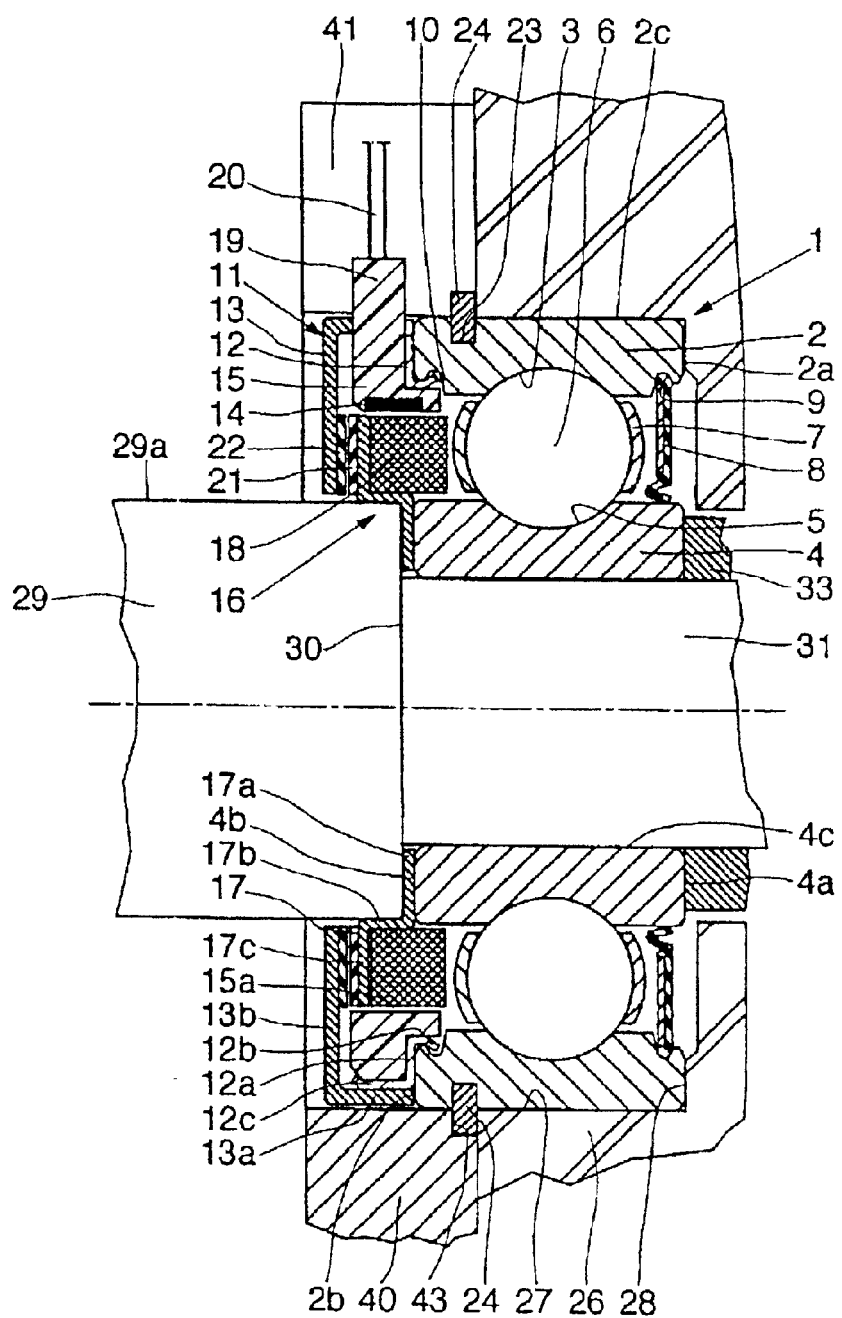
FIG. 6 is a view identical to FIG. 5, after installation.

Once the above relative angular position has been obtained, the cap 13 is pushed axially toward the outer race 2 until the free end of the cylindrical portion 13a comes into contact with the radial surface 2b of the outer race 2 (see FIG. 5). The rubber facings or pads 21 of the encoder 16 and 22 of the cap 13 are then in contact with each other, which provides a friction coupling between the encoder 16 and the cap 13, and thus the sensor 14. The friction here is greater than that between the frustoconical portion 17a of the support 17 and the radial surface 4b of the inner race 4. The indexing of the encoder 16 relative to the sensor 14 can therefore be preserved during transportation, manipulation and installation of the rolling bearing 1.

The rolling bearing 1 is installed by inserting it into the bore 27 in the casing 26 until the outer race 2 comes into contact with the shoulder 28 of the casing 26. The fixing part 40 is then screwed to the inside of the casing 26, using the terminal 19 of the sensor unit 11 to index the sensor unit 11, and therefore the sensor 14, angularly relative to the poles 37 of the stator 36. The fixed portion of the rolling bearing 1 and the casing 26 of the motor 25 are fastened together in this position by means of the fixing part 40.

The shaft 29 fitted with its rotor 38 is then inserted into the bore 4c of the rolling bearing 1 by an axial movement with no associated rotation, during which the cylindrical portion 31 of the shaft 29 centers the support 17 of the encoder 16 relative to the remainder of the rolling bearing 1. A spacer 33, a member 34 or any other power transmission member, and the nut 35 are then added from the side of the rolling bearing 1 opposite the shoulder 30 on the shaft 29. When the nut 35 is tightened, the inner race 4 moves toward the shoulder 30 and axially clamps and deforms the frustoconical portion 17a of the support 17 of the encoder 16. The frustoconical portion 17a is flattened to form a purely radial portion, which causes slight axial displacement toward the row of balls 6 of the cylindrical portions 17b and radial portions 17c of the support 17, the effect of which is to disengage from each other the facings 21 on the encoder 16 and 22 on the cap 13 and to enable rotation of the encoder 16 relative to the sensor 14.

In other words, after the encoder 16 is indexed relative to the sensor 14, the axial movement of the cap 13 toward the outer race leads to rotational coupling of these two components. During final installation, the clamping of the frustoconical portion 17a upon tightening of the nut 35 onto the shaft 29 uncouples the encoder 16 and the cap 13.

Figure 7:
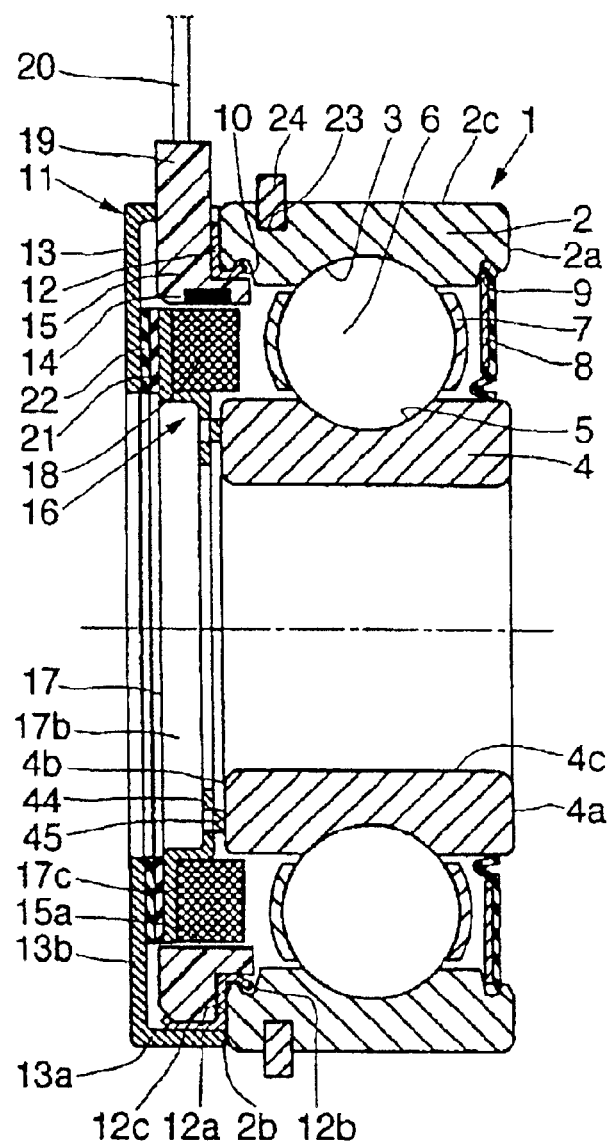
FIG. 7 is a view in axial section of a second embodiment of a rolling bearing according to the invention, before installation.
Figure 8:
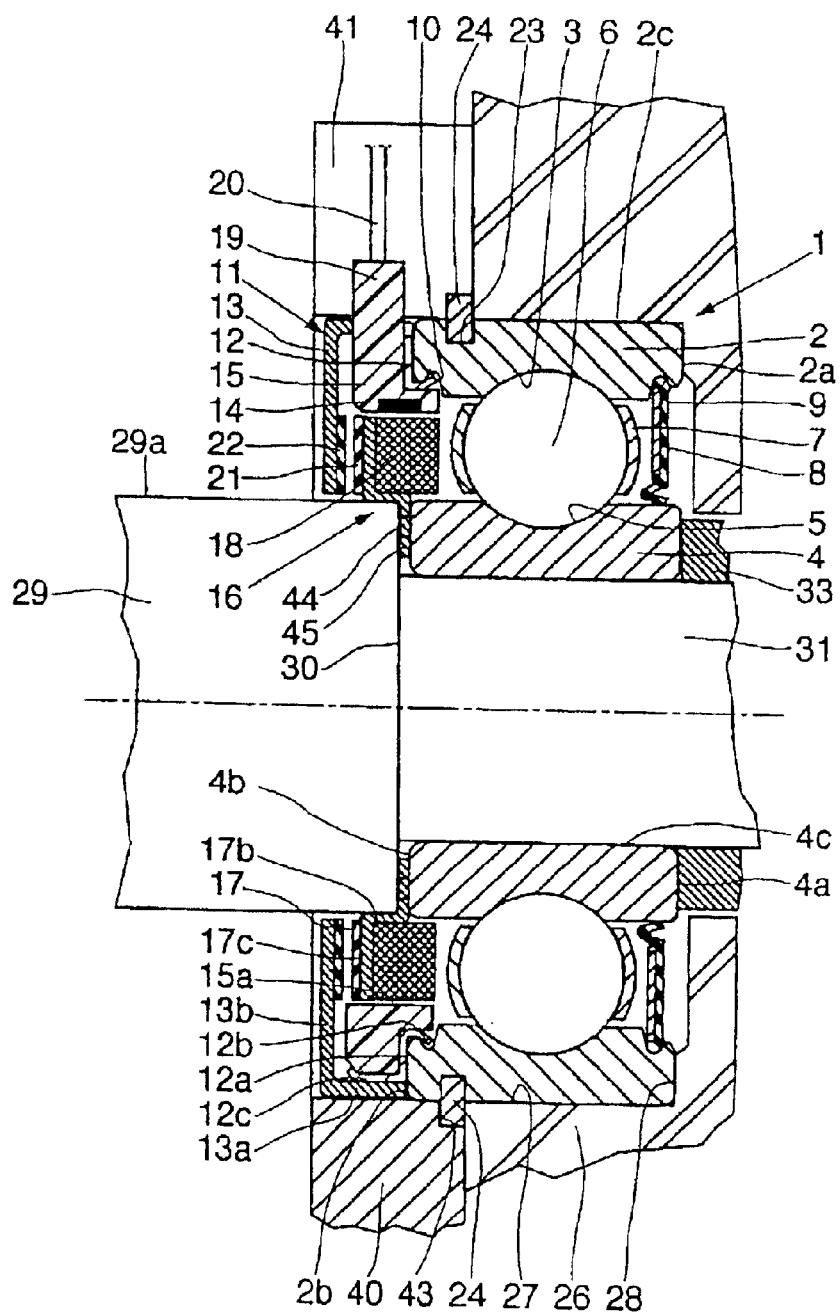
FIG. 8 is a view in axial section of the rolling bearing from FIG. 7, after installation.

The embodiment shown in FIGS. 7 and 8 is similar to those shown in the preceding figures except that the frustoconical portion of the support 17 of the encoder 16 is replaced by a radial portion 44. The radial portion 44 is provided with a plurality of tongues or lancings 45 formed by tears in said radial portion 44, for example. The tongues 45 are directed axially on the same side as the inner race 4.

Accordingly, after the encoder 16 is indexed relative to the sensor 14, and before installation on the shaft of the motor, i.e. in the position shown in FIG. 7, the tongues, 45 in contact with the front radial surface 4b of the inner race 4 bear on said radial surface 4b to move away from it the radial portion 44 and consequently the support 17, which brings together the facing 21 and the facing 22 and couples the encoder 16 and the cap 13.

The axial clamping of the instrumented rolling bearing against the shoulder 30 on the shaft causes axial displacement of the support 17 toward the row of balls 6.

In the final installation state shown in FIG. 8, the radial portion 44 and the tongues 45 are, as in the preceding embodiment, disposed between the shoulder 30 on the shaft 29 and the surface 4b of the inner race 4 and are clamped between said shoulder 30 and said surface 4b, which retracts the tongues 45, axially separates the facings 21 and 22, and uncouples the encoder 16 from the cap 13. The encoder 16 is therefore then constrained to rotate with the inner race 4 and the shaft 29 and is centered on said shaft 29, the cylindrical portion 17b of the support 17 of the encoder 16 being in contact with an outside surface 29a of the shaft 29, possibly with a snug fit.

Figure 9:
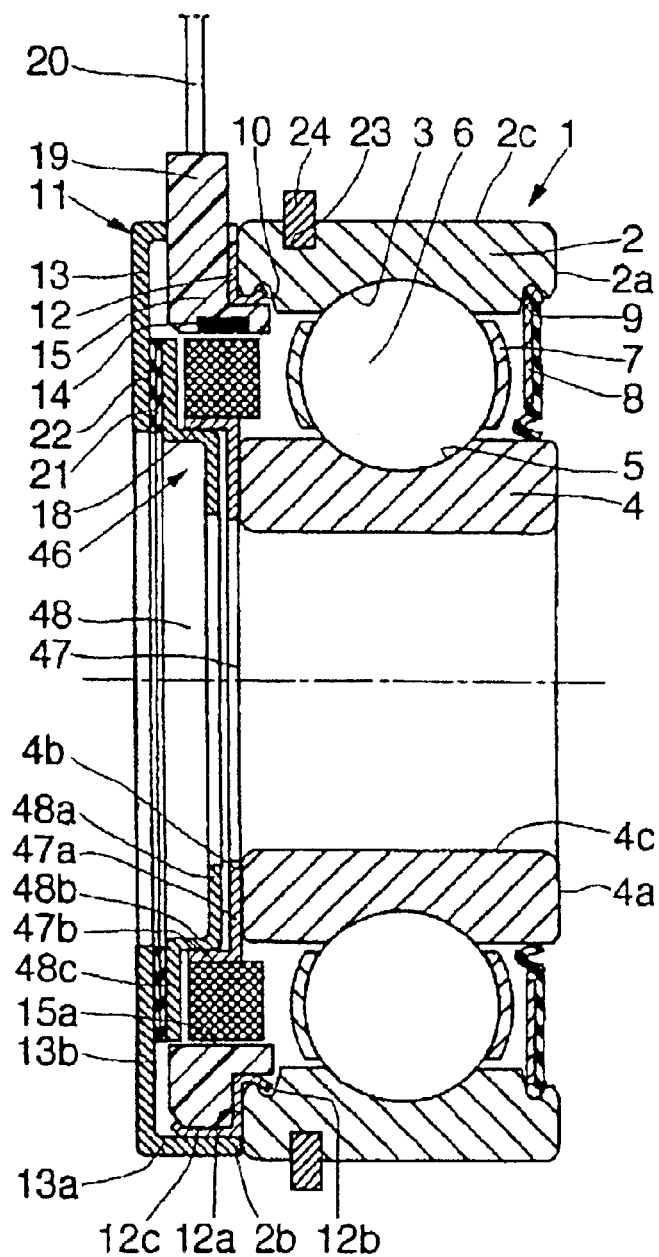
FIG. 9 is a view in axial section of a third embodiment of a rolling bearing according to the invention, before installation.
Figure 10:
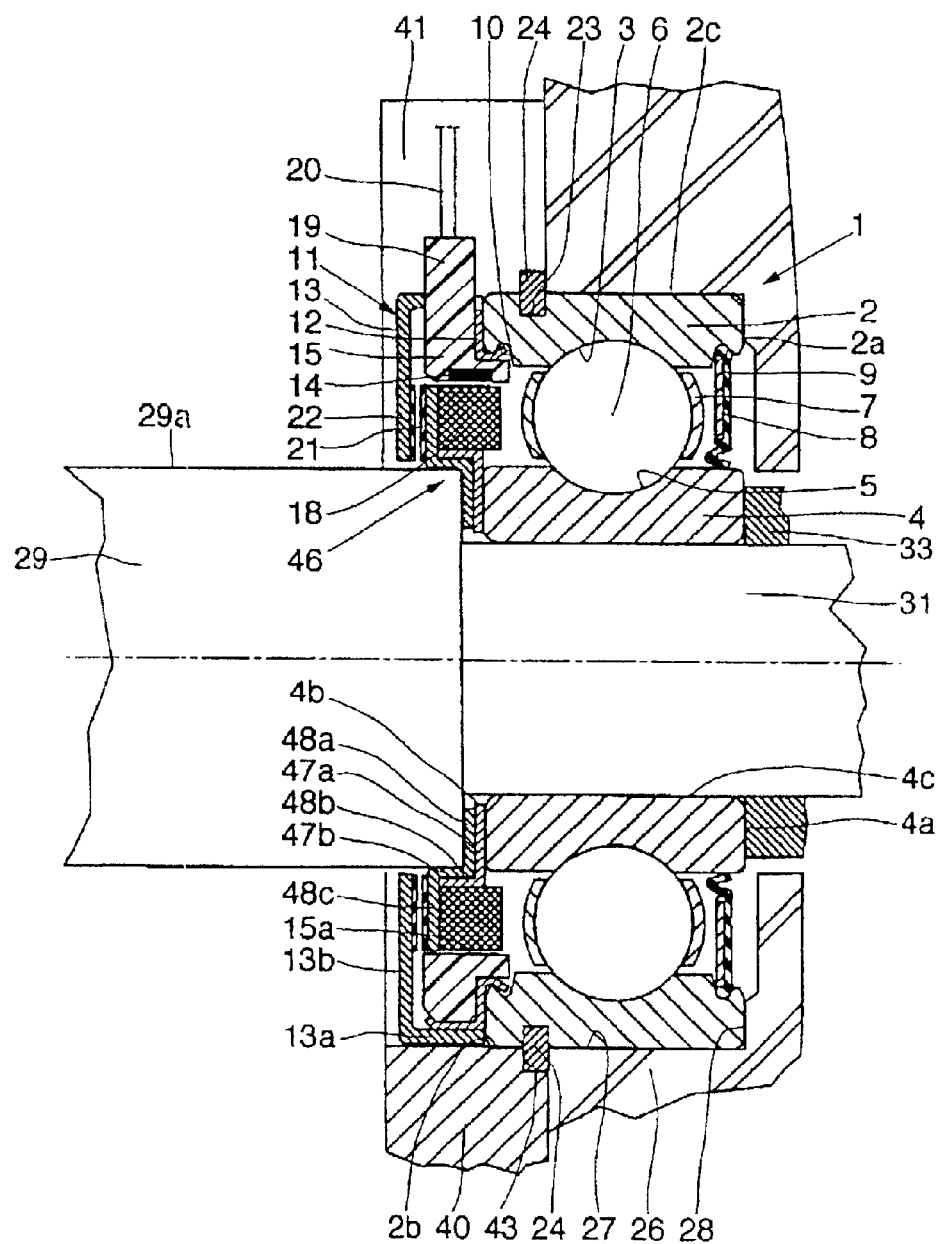
FIG. 10 is a view in axial section of a rolling bearing identical to that shown in FIG. 9, after installation.

The embodiment shown in FIGS. 9 and 10 is similar to the first embodiment, except that the encoder 16 has a different type of support 46. The support 46 is in two parts, comprising a first part 47 and a second part 48. The annular first part 47 has an L-shaped section with a radial portion 47a adapted to come into contact with the radial surface 4b of the inner race 4 and a cylindrical portion 47b extending from the outside edge of the radial portion 47a, outward and away from the rolling bodies 6. The active portion 18 is fixed to the outside surface of the cylindrical portion 47b.

The annular second part 48 of the support 46 has a radial portion 48a parallel to the radial portion 47a of the first part 47, and with a similar size in the radial direction, a cylindrical portion 48b extending axially outward, away from the rolling bodies 6, from the larger diameter edge of the radial portion 48a, and having a diameter suitable for fitting it into the bore in the cylindrical portion 47b of the first part 47, on the side opposite the active portion 18, and a radial portion 48c extending radially outward from the free end of the cylindrical portion 48b as far as the vicinity of the central portion 15 of the sensor unit 11. A facing 21 is provided on the outside face of the radial portion 48c, on the side opposite the active portion 18.

In the position shown in FIG. 9, the second part 48 has been partly fitted onto the first part 47 of the support 46.

In other words, there remains a residual axial space between the radial portion 47a and the radial portion 48a and also between the active portion 18 and the radial portion 48c. The facings 21 on the support 46 and 22 on the cap 13 are in contact with each other. The encoder 16 is therefore coupled to the cap 13. The elastomer/elastomer contact of the facing 21 with the facing 22 is of higher friction than the metal/metal contact of the radial portion 47a of the first part 47 of the support 46 on the radial surface 4b of the inner race 4. Thus any rotation of the inner race 4 will not cause corresponding rotation of the encoder 16.

When, after mounting the rolling bearing 1 in the casing 26 and screwing on the fixing part 40, the shaft 29 is inserted into the bore 4c of the inner race 4 of the rolling bearing 1 and then moved axially in order to fix it, the shoulder 30 comes into contact with the radial portion 48a of the second part of the support 46 and moves it axially toward the row of balls 6 until it comes into contact with the radial portion 47a of the first part 47 of the support 46, which causes complete fitting of the second part 48 into the first part 47, contact of the radial portion 48c with the active portion 18, separation of the facings 21 and 22 and therefore uncoupling of the encoder 16 from the cap 13, and coupling of the encoder to the shaft 29 and the inner race 4.

Additionally, in all the preceding embodiments, if the rotor 38 is indexed by appropriate means relative to a mechanical index of the encoder 16 or relative to an index of the casing 26 before it is fitted into the bore of the instrumented rolling bearing 1, a complete indexing chain is obtained between the stator 36 and the rotor 38 through the intermediary of the instrumented rolling bearing 1.

In the embodiment shown in FIGS. 11 to 14, the cap of the sensor unit 11 and the support of the encoder 16 differ from those of the embodiment shown in FIGS. 1 to 6. The annular support 49 of the encoder 16 has a radial portion 49c adapted to come into contact with the radial surface 4b of the inner race 4, with an inside diameter substantially equal to that of the bore of said inner race 4, a cylindrical portion 49b extending axially outward, away from the rolling bodies 6, from the larger diameter edge of the radial portion 49a, and a radial portion 49c extending radially outward from the end of the cylindrical portion 49b opposite the radial portion 49a. The active portion 18 of the encoder 16 is in contact with the outside surface of the cylindrical portion 49b and, at the same end as the rolling body 6, with the inside surface of the radial portion 49c.

The cap 50 of the sensor unit 11 has a cylindrical portion 50a, similar to the corresponding portion of the cap from the first embodiment and provided with a notch 50c through which the terminal 19 passes, and a radial portion 50b extending radially inward from the end of the cylindrical portion opposite the outer race 2. It can be seen that here the inside diameter of the radial portion 50b is similar to that of the bore of the central portion 15 of the sensor unit 11. However, as an alternative to this, a radial portion 50b of larger or smaller diameter can be provided. The smaller diameter edge of said radial portion 50b is connected by a connecting portion 51 to a coupling member 52. The cap 50 is fitted all the way onto the support 12.

The annular coupling member 52 has a radial portion 52a whose outside diameter is slightly less than the inside diameter of the radial portion 50b, the connecting portion 51 being disposed between said radial portion 50b and said radial portion 52a, a cylindrical portion 52b extending axially toward the rolling bodies 6 from the inside diameter of the radial portion 52a, being adapted to be fitted partly or entirely onto the cylindrical portion 49b of the support 49 of the encoder 16, and a frustoconical portion 52c extending from the end of the cylindrical portion 52b on the same side as the rolling bodies 6, and extending radially inward and axially toward said rolling bodies 6. The inside diameter of the frustoconical portion 52c is greater than that of the radial portion 49a of the support 49 of the encoder 16. The tolerances of the parts are such that the radial portion 49a of the support 49 is not axially prestressed between the radial surface 4b of the inner race 4 and the frustoconical portion 52c of the coupling member.

Figure 11:
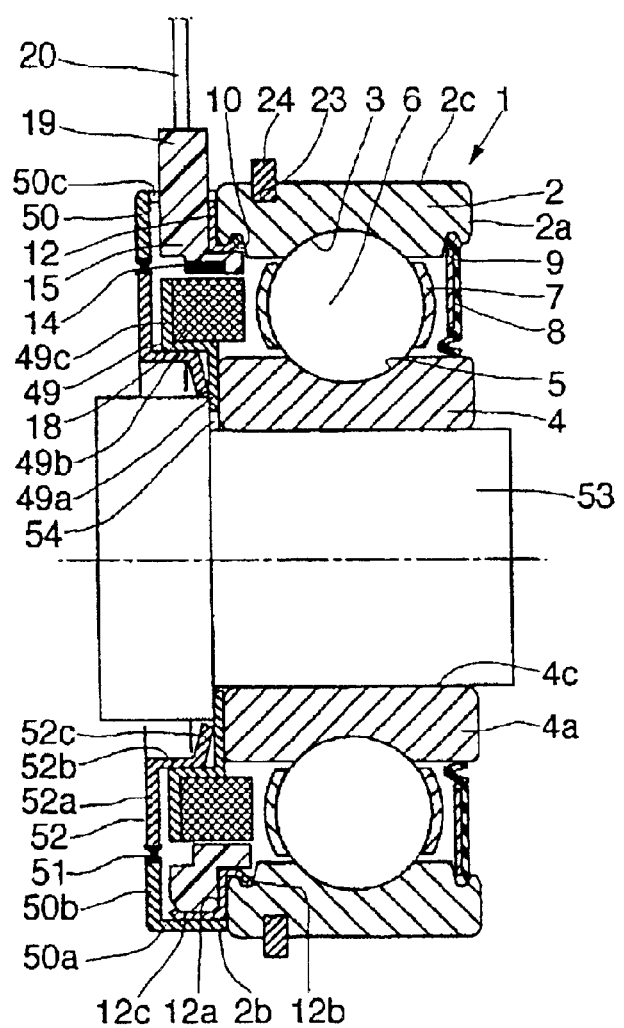
FIG. 11 is a view in axial section of a fourth embodiment of a rolling bearing according to the invention fitted to an orientation tool.

In the position shown in FIG. 11, a generally cylindrical tool 53 is inserted in the bore 4c of the inner ring 4. The tool 53 has a lug 54 whose shape conforms to that of a notch 55 on the inside edge of the radial portion 49a of the support 49 of the encoder 16. Accordingly, because of the coupling between the lug 54 and the notch 55, rotating the tool 53 rotates the encoder 16. The fit between the support 49 and the coupling member 52 is chosen to allow rotation of the encoder 16 independently of the coupling member 52 and the cap 50. Thus the encoder 16 can be indexed relative to the sensor 14. When the tool 53 has been removed, this indexing is maintained by the protection offered by the coupling member 52, the friction contact between the cylindrical portion 52b and the cylindrical portion 49b of the support 49, as shown in FIG. 12.

As can be seen in FIG. 13, the connecting portion 51 comprises four weak studs 56 in the axial space between the radial portion 50b of the cap 50 and the radial portion 52a of the coupling member 52, which are coplanar and concentric. The studs 56 are advantageously made from a synthetic material and adapted to resist a predetermined axial force, above which they break.

After fixing the instrumented rolling bearing 1 into the casing 26, as already explained with reference to the preceding embodiments, the shaft 29 is inserted, its outside surface coming into contact with the bore in the cylindrical portion 52b of the coupling member 52 and the shoulder 30 then coming into contact with the frustoconical portion 52c of the same coupling member 52. Further axial movement of the shaft 29 deforms the frustoconical portion 52c, which is progressively straightened until it becomes radial. Because the cap 13, being already in axial contact with the radial surface 2b of the outer race 2, cannot move axially, the axial movement of the whole of the coupling member 52 toward the row of balls 6 breaks the studs 56 of the connecting part 51.

Figure 14:
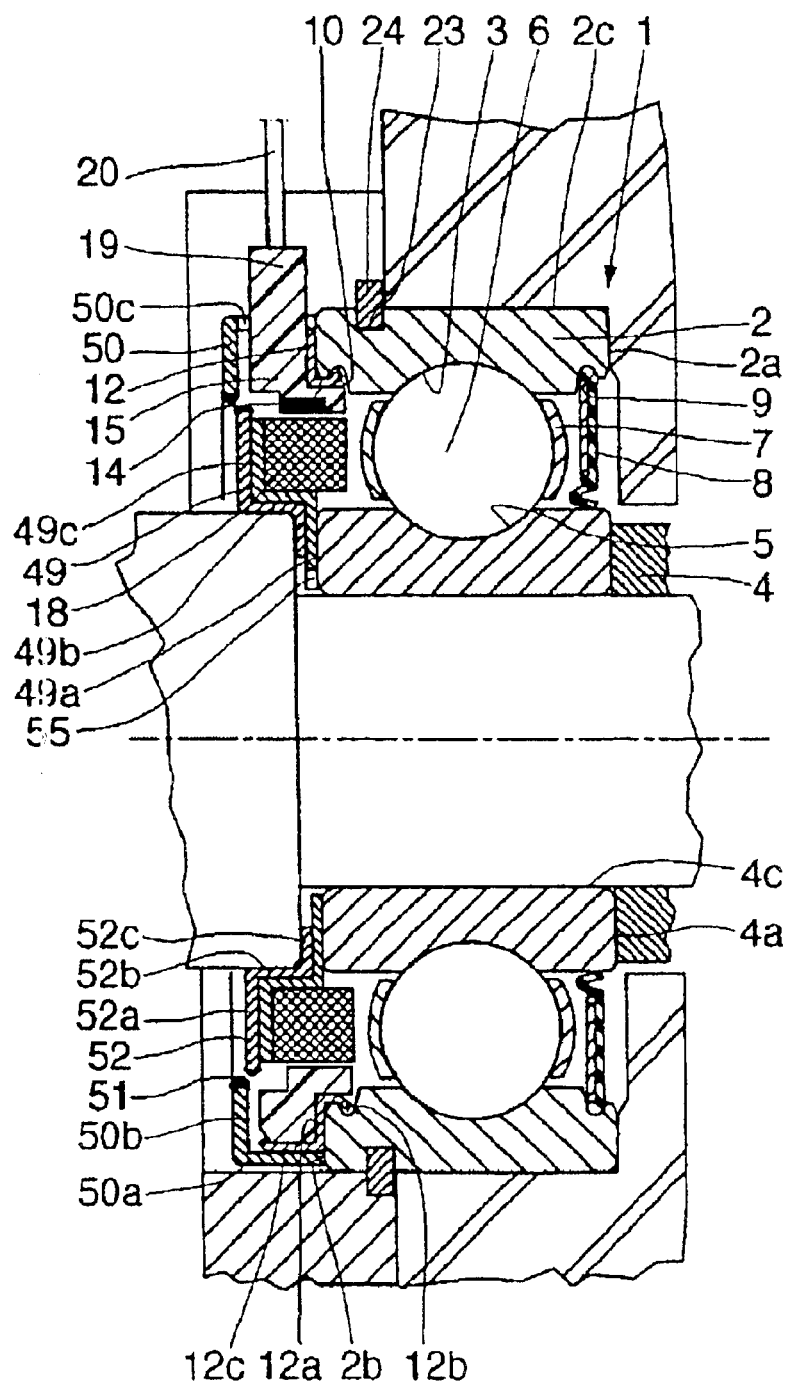
FIG. 14 is a view identical to FIG. 11, after installation.
Figure 16:
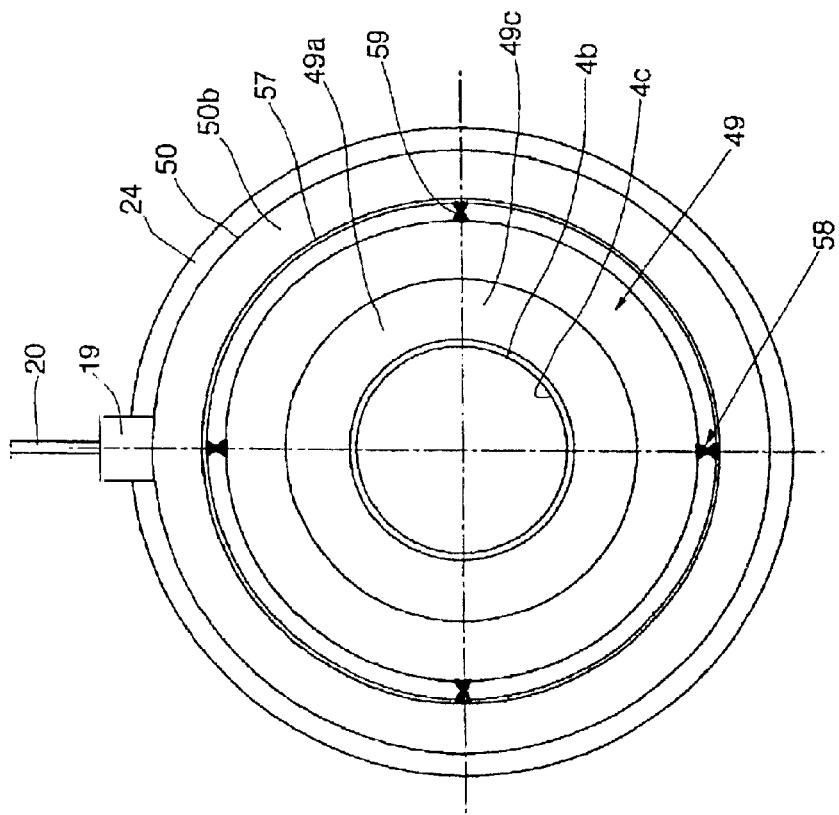
FIG. 16 is a side elevation view of the rolling bearing from FIG. 15.

In the final installation position, shown in FIG. 14, the shoulder 30 has caused the frustoconical portion 52c of the coupling member 52 and the radial portion 49a of the support 49 to be clamped against the inner race 4 and the encoder 16 to be fastened to said shaft 29 and said inner race 4. The aforementioned axial movement offsets the radial portion 52a of the coupling member 52 relative to the radial portion 50b of the cap 50, which are then no longer coplanar, but slightly offset.

The friction contact between the support 49 of the encoder 16 and the coupling member 52, which before installation is fastened to the cap 50, maintains the angular indexing of the sensor 14 and the encoder 16 until the instrumented rolling bearing 1 is installed in the motor 25, which crushes the frustoconical portion 52c of the coupling member 50. The weak studs 56 break when the nut is tightened or when the rotor is rotated if they have not broken before this. As an alternative to the above, the encoder 16 could be indexed first by means of the tool 53 with the lug 54 and the cap 50 then fitted.

The embodiment shown in FIGS. 15 to 18 is similar to the preceding one except that the cap 50 has no connecting portion. A disk 57 is disposed axially between the radial portion 50b of the cap 50 and the central portion 15 of the sensor unit 11 and radially inside the cylindrical portion 50a of the cap 50. A connecting portion 58 similar to that of the preceding embodiment is formed between the larger diameter end of the radial portion 49c of the support 49 of the encoder 16 that is extended very slightly beyond the cylindrical outside surface of the active portion 18 and the smaller diameter edge of the disk 57.

Figure 15:
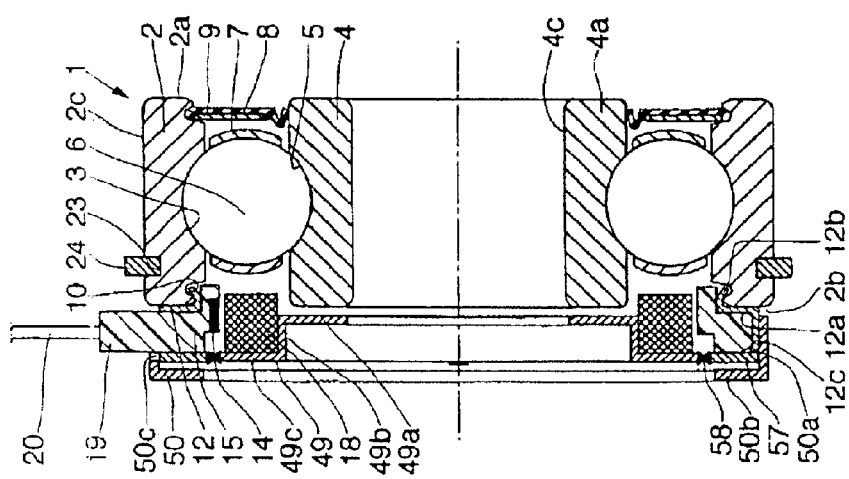
FIG. 15 is a view in axial section of a fifth embodiment of a rolling bearing according to the invention, before pre-indexing.

As can be seen in FIG. 15, the encoder 16, which is therefore fastened axially and circumferentially to the disk 57, has a small axial clearance with respect to the remainder of the rolling bearing 1 because of the axial space defined hereinabove, in which the disk 57 is disposed and which is slightly larger than the thickness of said disk 57. The encoder 16 is free to turn relative to the sensor unit 11 and relative to the inner race 4. The radial portion 49a of the support 49 is separated axially from the inner race 4. In this position, the cap 50 is not fitted all the way on to the support 12, in a similar way to the partial fitting of the cap 13 in the embodiment shown in FIGS. 1 to 6. In this position the encoder 16 can be adequately oriented, i.e. indexed, relative to the sensor 14.

Figure 17:
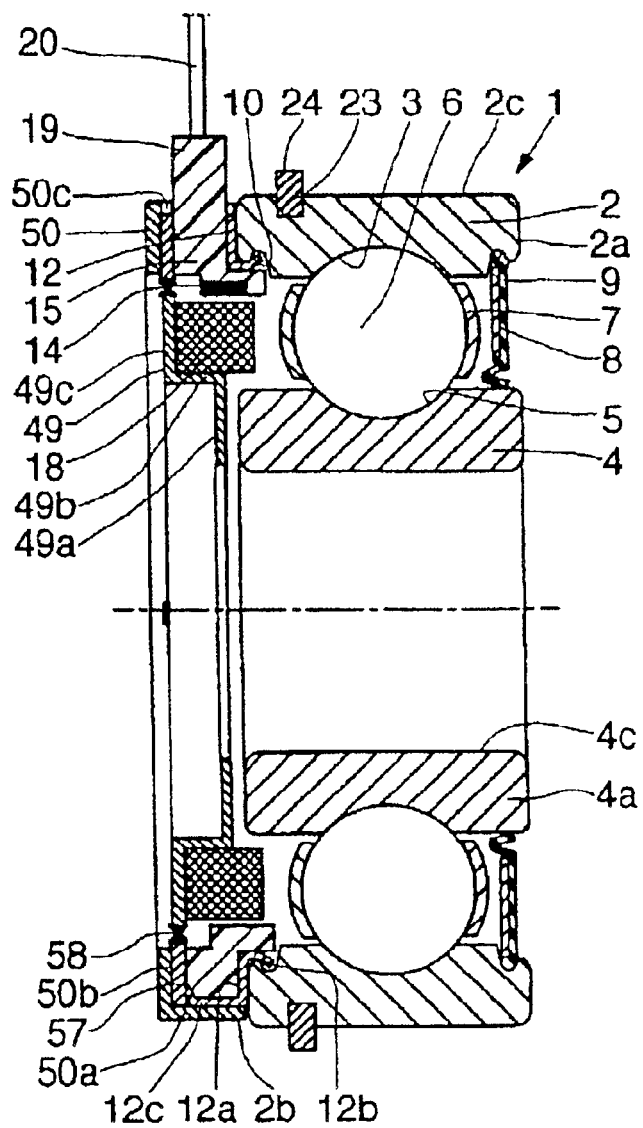
FIG. 17 is a view identical to FIG. 15, before installation and after angular indexing.

Indexing having been effected, the cap 50 is then pushed axially toward the rolling bodies 6 until the disk 57 is clamped between the radial portion 50b of the cap 50 and the central portion 15 of the sensor unit 11, as shown in FIG. 17. The disk 57 is therefore constrained to move in translation and in rotation with the sensor unit 11. The encoder 16 is therefore immobilized circumferentially relative to the sensor 14 by the friction contact between the disk 57 and the radial portion 50b of the cap 50, on the one hand, and the central portion 15 of the sensor unit, on the other hand. Of course, rubber pads could be provided between thee disk 57 and the inside surface of the radial portion 50b of the cap to increase the coefficient of friction between these parts.

The instrumented rolling bearing 1 is then fixed into the housing provided for this purpose in the casing 26, as explained above. The shaft 29 fitted with its rotor is installed in the rolling bearing 1 by a movement in the axial direction. Thus the cylindrical portion 31 of the shaft 29 is, slid into the bore 4c of the inner race 4, the shoulder 30 moving axially toward the rolling bodies 6. The cylindrical portion 49b of the support 49 is progressively fitted over the outside surface 29a of the shaft 29, and then the shoulder 30 comes into contact with the radial portion 49a of said support 49. Further axial movement of the shaft 29 entrains the support 49 and therefore the encoder 16 axially toward the rolling bodies 6, which breaks the connecting portion 58 formed, as in the preceding embodiment, by four weak synthetic material studs 59.

Figure 18:
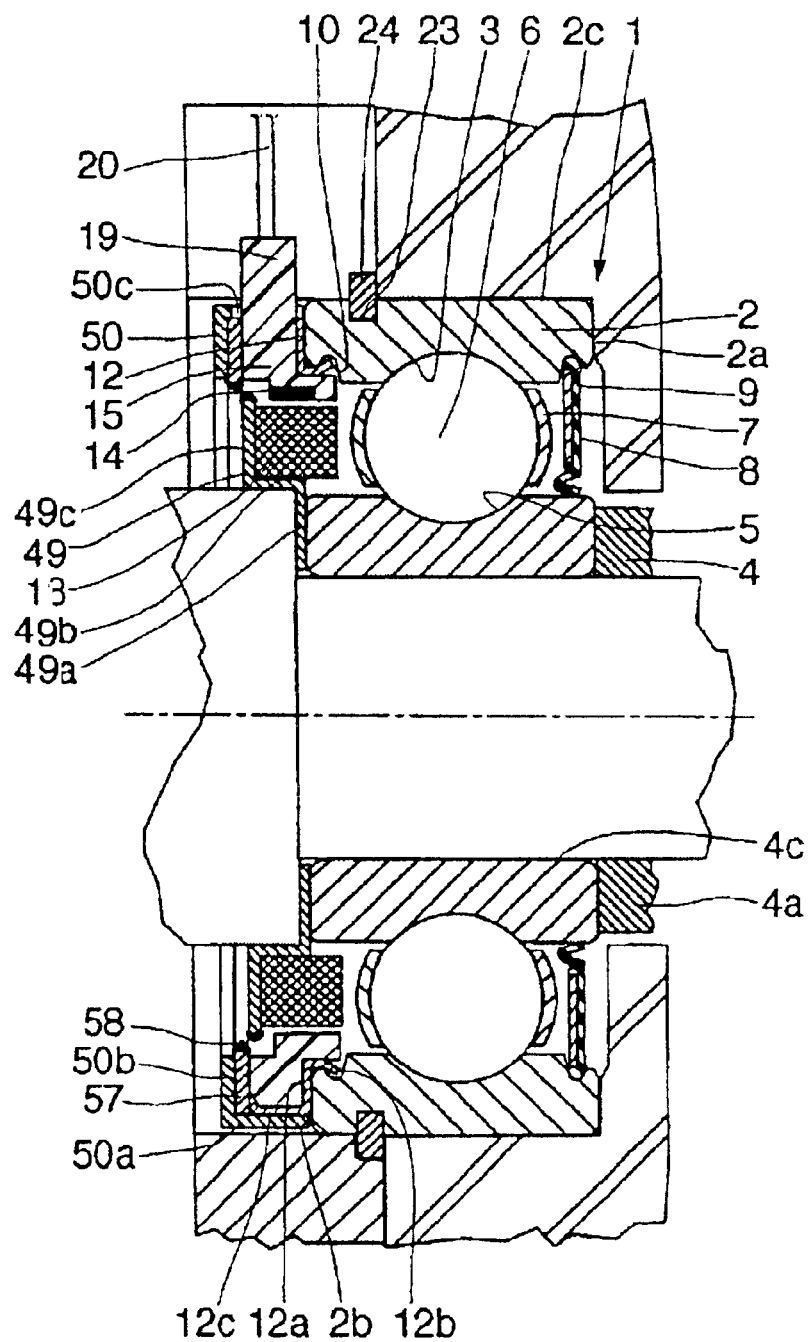
FIG. 18 is a view identical to FIG. 15, after installation.

FIG. 18 shows the final installed state. It can be seen that the disk 57 has remained fixed with respect to the remainder of the sensor unit 11 and that the encoder 16 has been offset, leading to a misalignment of the radial portion 49c of the support 49 and the disk 57 which were previously coplanar. The radial portion 49a of the support 49 of the encoder 16 is clamped between the shoulder 30 and the radial surface 4b of the inner race 4, so that the encoder 16 is immobilized in the circumferential direction with respect to said shaft 29 and said inner race 4. The encoder 16 can then turn freely with respect to the sensor unit 11. The axial offset between the radial portion 49c of the support 49 and the disk 57 eliminates all risk of unwanted friction between the studs after they break upon rotation.

Figure 19:
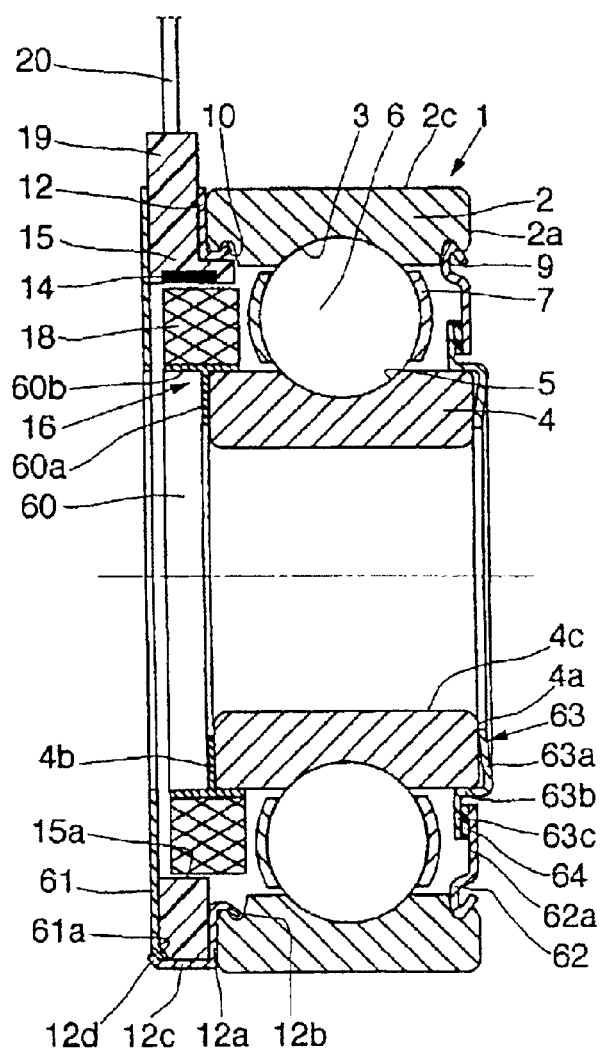
FIG. 19 is a view in axial section of a sixth embodiment of a rolling bearing according to the invention, before installation.
Figure 20:
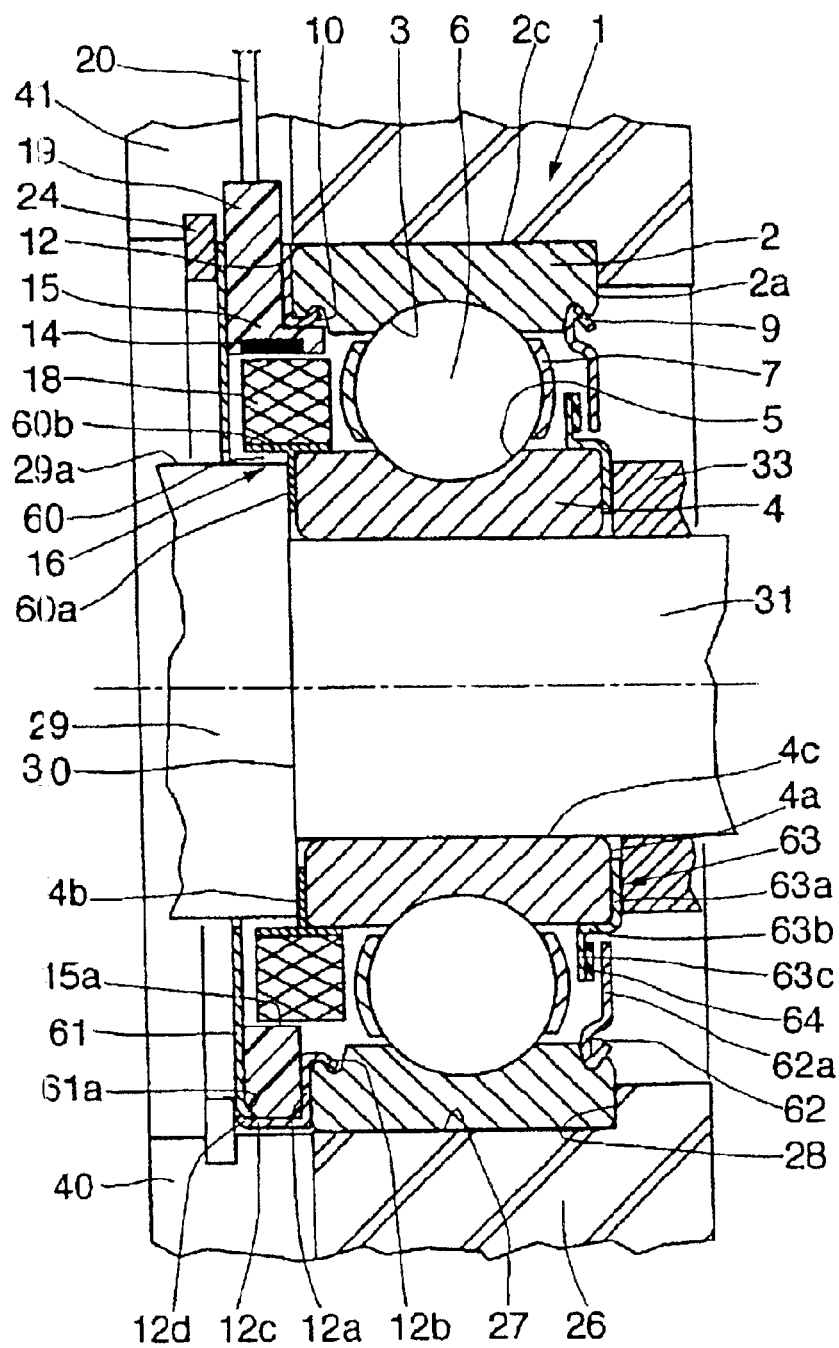
FIG. 20 is a view identical to FIG. 19, after installation.

In, the embodiment shown in FIGS. 19 and 20, the encoder 16 has an annular support 60 with a T-shaped section comprising a central portion 60a forming the stem of the T-shape in contact with the lateral face 4b of the inner race 4 and a cylindrical portion 60b forming the crossbar of the T-shape, joined to the outside edge of the radial portion 60a, supporting the active portion 18 on its outside surface, and fitted onto an external rolling bearing surface of the inner race 4.

The sensor unit 11 includes, in addition to the support 12, the sensor element 14 and the central portion 15, an annular radial wall 61 whose inside diameter is substantially equal to the diameter of the cylindrical portion 60b of the support 60 and whose outside diameter is substantially equal to the diameter of the bore of the cylindrical portion 12c of the support 12. The radial wall 61 is in contact with the central portion 15 on the side opposite the outer race 2. The radial wall 61 is retained by the bent rim 12d at the free end of the cylindrical portion 12c. The outside edge 61a of the radial wall 61 is bent obliquely toward the outer race 2, assuming a shape complementary to that of the rim 12d.

A metal flange 62 is fixed into the groove 9 in the outer race 2 and has a radial portion 62a extending inward and substantially coplanar with the radial surface 4a of the inner race 4. An annular friction member 63 is mounted on the inner race 4 and has an elastic frustoconical portion 63a whose free inside edge is in contact with the radial surface 4a (FIG. 19), a cylindrical portion 63b formed from the outside edge of the frustoconical portion 63a and extending toward the rolling bodies 6, fitted over an outside rolling bearing surface of the inner race 4, and a radial portion 63c extending outward. The cylindrical portion 63b is disposed radially between the flange 62 and the inner race 4. The radial portion 63c is disposed axially between the rolling body 6 and the radial portion 62a of the flange 62. Before installation, the outside edge of the frustoconical portion 63a is offset axially with respect to the radial surface 4a of the outer race 4.

In addition to the metal portions 63a, 63b and 63c, which are formed in one piece, the friction member 63 comprises a friction facing 64, for example an elastomer facing, fastened to the radial portion 63c on the same side as the flange 62 and, before installation, in contact with the radial portion 62a of the flange 62, whence the temporary angular fastening together of the two races 2 and 4 of the rolling bearing 1.

After installation, the spacer 33 crushes the frustoconical portion 63a against the radial surface 4a of the inner race 4 and confers a radial shape on it, which causes axial displacement of the friction member 63 toward the rolling body 6 and separation of the facing 64 from the flange 62 (see FIG. 20).

The few embodiments described above are not limiting on the intention. Sensor units comprising a plurality of sensors could of course be used, for example to determine the rotation direction. The magnetic detector system could be replaced with an optical detector system. The instrumented rolling bearing can be installed not only in an electric mentor, but in any device where it is required to know the angular position of one part relative to another.

The invention provides an instrumented rolling bearing whose encoder can be pre-indexed relative to the sensor before shipping to the end user. The instrumented rolling bearing can then be manipulated safely in various ways without the indexing being lost. Installation of the instrumented rolling bearing by the end user, for example in an electric motor, is effected simply, reliably and economically, without having to pay any attention, while manipulating and installing the instrumented rolling bearing, to the angular indexing of the encoder relative to the sensor, which is maintained for as long as required.

What is claimed is:

1. An instrumented antifriction rolling bearing including a non-rotatable part comprising a non-rotatable race and sensor means, a rotatable part comprising a rotatable race and encoding means, and a row of rolling bodies arranged between two raceways of the non-rotatable ring and the rotatable ring, the non-rotatable sensing means and the rotatable encoding means forming a system for detecting rotation parameters, said rolling bearing further comprising temporary retaining means for temporarily maintaining the angular indexing of the encoding means relative to the sensing means in an angular position wherein said encoding means generate a reference signal in the sensing means, the temporary angular indexing being released by axial displacement of at least part of a component of the device toward the row of rolling bodies.

2. A bearing according to claim 1, wherein the part that moves axially is adapted to be fastened to the rotatable part of the bearing.

3. A bearing according to claim 1, wherein the part that moves axially toward the row of rolling bodies is a support of the encoder means.

4. A bearing according to claim 1, wherein the part that moves axially toward the row of rolling bodies is mounted on a support of the encoder means.

5. A bearing according to claim 1, wherein the part that moves axially toward the row of rolling bodies is a member mounted on the rotatable race of the rolling bearing on the side opposite the encoder means.

6. A bearing according to claim 1, wherein said temporary retaining means are part of said detector system.

7. A bearing according to claim 1, wherein said temporary retaining means comprise at least one friction member.

8. A bearing according to claim 7, wherein the friction member comprises an elastomer pad.

9. A bearing according to claim 1, wherein the encoder means comprise a support having a first surface in axial contact with the rotatable race and a second surface axially opposite the first surface and in axial contact with the non-rotatable part.

10. A bearing according to claim 9, wherein said support is annular and has a radial or frustoconical portion including said first surface, a cylindrical portion and a radial portion including said second surface.

11. A bearing according to claim 9, wherein the coefficient of friction between the first surface of said support and the rotatable race is lower than that between the second surface and the non-rotatable part.

12. A bearing according to claim 1, wherein said temporary retaining means comprise at least one weak member.

13. A bearing according to claim 12, wherein the encoder means include a support having a connecting portion connecting it to the non-rotatable part, which connecting portion is fastened to the support of the encoder means and of the non-rotatable part before the weak member is broken, and has a mechanically weak area adapted to break to separate the encoder means from the non-rotatable part.

14. A bearing according to claim 13, wherein the mechanically weak area comprises a plurality of synthetic material studs.

15. A bearing according to claim 1, wherein the encoder means include a support having a connecting portion, the connecting portion being between a radial portion of a protective cap for the sensor means and a radial portion of the support for the encoder means, which are disposed in a common plane before the connection is broken, the connecting portion being formed in an annular space between them.

16. A bearing according to claim 1, wherein the encoder means includes a support made in one piece.

17. A bearing according to claim 1, wherein the encoder means includes a support made in two parts at least one of which is in direct contact with the encoder means and at least one of which is in direct contact with the temporary retaining means, the two parts being concentric and fitting together with friction contact.

18. A bearing according to claim 1, wherein the encoder means includes a support having at least one axially deformable portion.

19. A method of installing an instrumented rolling bearing on a shaft, the rolling bearing being of the type having a non-rotatable part comprising a non-rotatable race and sensor means, a rotatable part comprising a rotatable race and encoder means, and a row of rolling bodies disposed between two rolling paths of the non-rotatable and rotatable races, the non-rotatable sensor means and the rotatable encoder means forming a rotation parameter detector system in which, prior to installation, the encoder means are retained relative to the sensor means in an angular position in which said encoder means generate a reference signal in the sensor means during clamping of the rolling bearing on the shaft, the encoder means and the rotatable race of the rolling bearing are fastened together circumferentially, and the retention of the angular position of the encoder means relative to the sensor means is eliminated.

20. A method according to claim 19, wherein the encoder means are detached from the retaining means by axial movement when fastening the encoder means to the rotatable race of the rolling bearing.

21. A method according to claim 19, wherein the encoder means are detached from the retaining means by rotation of the rotatable race.

* * * * *